Nov. 23, 1937.   H. M. KIECKHEFER   2,099,936
ART OF MANUFACTURING CONTAINERS OR PARTS THEREOF
Filed June 8, 1936   3 Sheets-Sheet 1
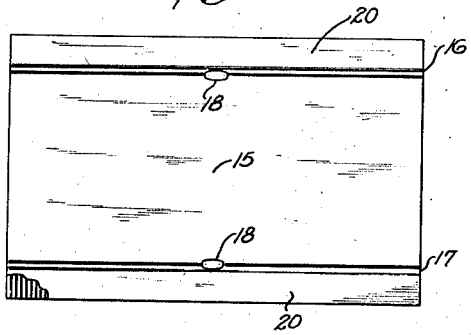
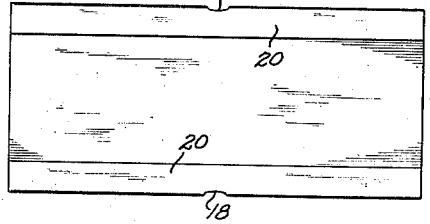
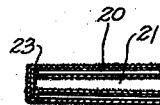
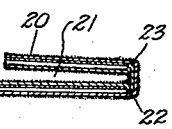
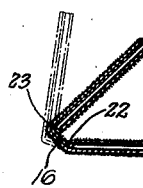
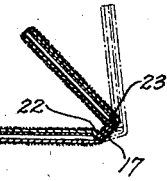
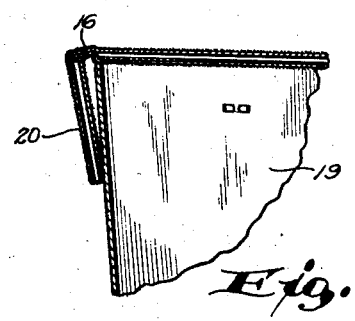
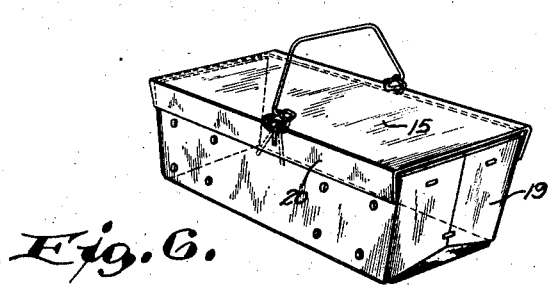
INVENTOR.
Herbert M. Kieckhefer
BY
ATTORNEYS Nov. 23, 1937.   H. M. KIECKHEFER   2,099,936
ART OF MANUFACTURING CONTAINERS OR PARTS THEREOF
Filed June 8, 1936   3 Sheets-Sheet 2
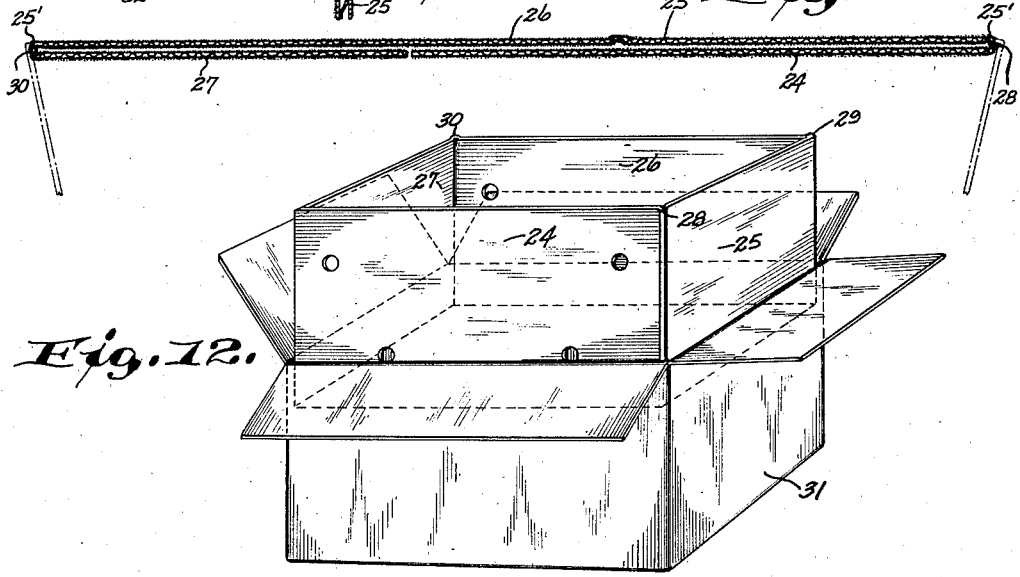
INVENTOR.
Herbert M. Kieckhefer
BY
ATTORNEYS.

Nov. 23, 1937.　　　H. M. KIECKHEFER　　　2,099,936
ART OF MANUFACTURING CONTAINERS OR PARTS THEREOF
Filed June 8, 1936　　　3 Sheets-Sheet 3
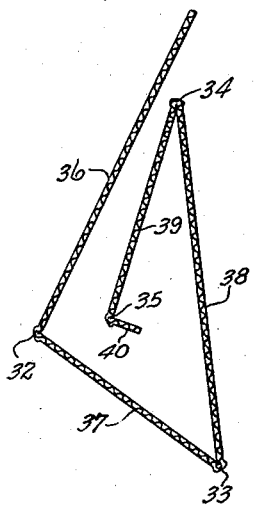
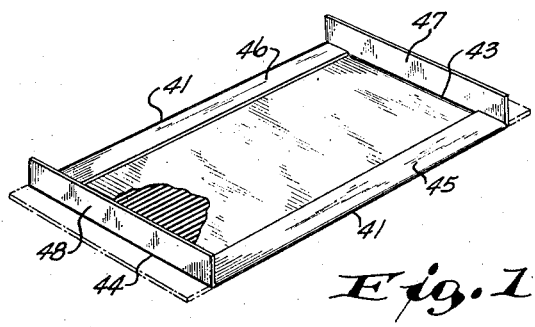
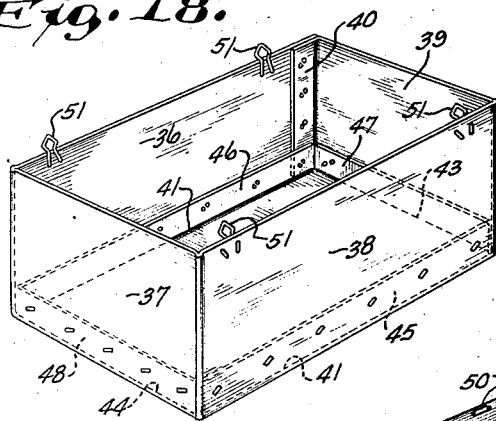
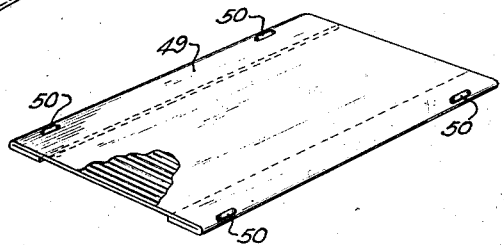
INVENTOR.
Herbert M. Kieckhefer
BY
ATTORNEYS.

Patented Nov. 23, 1937

2,099,936

UNITED STATES PATENT OFFICE 2,099,936

ART OF MANUFACTURING CONTAINERS OR PARTS THEREOF

Herbert M. Kieckhefer, Riverton, N. J., assignor, by mesne assignments, to Kieckhefer Container Company, Delair, N. J., a corporation of Delaware Application June 8, 1936, Serial No. 84,148

12 Claims. (Cl. 93—36)

This invention relates to improvements in the art of manufacturing containers or parts thereof.

It has heretofore been proposed to treat assembled fiberboard boxes with sulphur for the purpose of increasing the rigidity thereof and to render the same impervious to moisture. However, these boxes when so treated, could not be collapsed for shipment and therefore were impractical for most purposes. The present invention relates in general to this type of treatment but contemplates a different and improved method of procedure and an improved article of manufacture whereby the impregnated container parts may be compactly and economically shipped to the user in flat form and subsequently assembled by the user into the proper form for use as a container, box liner, container or basket cover, or other container element.

In prior attempts at sulphur impregnation, solid fiberboard material has been used and efforts to first treat the material and then subsequently form containers therefrom were entirely unsatisfactory as the sulphur treated material, due to the penetration of the sulphur into the center of the solid sheet, resisted bending, and if bending were finally accomplished, there would be a wedging action at the line of fold which would break the board at the score.

It has been found that corrugated material, due to the fact that it is constructed of two liner members spaced apart by a corrugated member so that the center is not solid, can be bent much more readily after impregnation than solid fiberboard. When said bending is performed on impregnated corrugated board, the center corrugated member, even if impregnation has extended thereto, will crush very readily due to the fact that it is so light in calibre. However, even with the use of corrugated board, difficulties were encountered in endeavoring to form impregnated containers therefrom which could be shipped in knockdown form.

It is accordingly an object of the present invention to provide an improved method of manufacturing containers or parts thereof which includes the use of corrugated board and the manipulation of said board in a particular way during and after impregnation so that the sulphur impregnated containers and parts thereof may be formed which can be shipped in knockdown condition.

A more specific object of the invention is to provide a method of manufacturing impregnated knockdown containers or parts thereof comprising cutting and scoring corrugated board along desired lines to form a blank for a container part, dipping the scored board into molten sulphur, and folding portions of the blank on said lines of scoring to a superimposed compact condition for shipment prior to solidification of the sulphur.

It is a further object of the present invention to provide an improved method of manufacturing impregnated knockdown container parts which is applicable not only to the formation of complete containers, but also to the formation of flanged impregnated basket covers and to the manufacture of impregnated liners for unimpregnated containers, which liners and flanged covers may be shipped in flat compact form in spite of the impregnation.

A further object of the invention is to provide a method of manufacturing containers and parts thereof which includes the use of wide lines of scoring to facilitate the drainage of sulphur during dipping, said wide lines of scoring also permitting bending of parts to a ninety-degree angle during assembly, there being an inherent resistance to further bending due to the impregnation and the type of scoring.

With the above and other objects in view, the invention consists of the improved art of manufacturing containers and parts thereof in all its parts and combinations as set forth in the claims, and all equivalents thereof.

In the accompanying drawings illustrating preferred embodiments of the invention in which the same reference numerals designate the same parts in all of the views:

Fig. 1 is a plan view of a scored cover blank;

Fig. 2 is a bottom view of the cover blank showing the flanges folded at one hundred eighty degrees prior to impregnation;

Fig. 3 is a transverse sectional view through the cover, on an enlarged scale after the same has been impregnated;

Fig. 4 is a similar view illustrating how the flanges are bent to suitable form for use;

Fig. 5 is an end view of a stack of covers showing how they may be compactly shipped or stored;

Fig. 6 is a perspective view of a basket showing one of the improved covers applied thereto;

Fig. 7 is a fragmentary vertical sectional view through the basket, on an enlarged scale showing how the cover flange engages the side wall of the basket;

Fig. 8 is an end view of a liner for a shipping container illustrating the form in which it is preferred to hold the liner during immersion in impregnating material;

Fig. 9 is an edge view of a folded liner after impregnation, the dot-and-dash lines indicating how parts thereof are bent to assembly form;

Fig. 10 is an enlarged sectional view through one of the lines of scoring of the liner;

Fig. 11 is a similar view showing one of the parts adjacent said line of scoring bent to assembly form;

Fig. 12 is a perspective view of a shipping container part, one of the liners being inserted therein;

Fig. 13 is a horizontal sectional view through a shipping container showing a liner in position therein;

Fig. 14 is an end view of a stack of liners showing how they may be shipped or stored;

Fig. 15 is an end view showing how the material forming the side walls of a container is held during immersion in the impregnating material;

Fig. 16 is an edge view of the material of Fig. 15 in flat compact shipping condition;

Fig. 17 is a perspective view showing how material adapted to form the bottom of a container is bent during impregnation, the dot-and-dash lines indicating how the end flanges are flattened out before the sulphur hardens;

Fig. 18 is a perspective view of the shipping box in assembled form without the cover; and Fig. 19 is a perspective view of a cover therefor.

Referring more particularly to Figs. 1 to 7 of the drawings, the numeral 15 designates a section of corrugated board which has been scored along the lines 16 and 17 and which may be apertured as at 18. The lines of scoring are preferably wider than used in standard practice for a purpose to be hereinafter explained. The section of material thus prepared is suitable for use as a cover for a basket 19 (Fig. 6), and it is customary for this type of cover to have side flanges 20 which depend from the side edges of the cover and engage the sides of the basket.

In order to render the cover more rigid, and impervious to moisture, it is proposed to treat the same by impregnation, preferably in sulphur, and it is to this sulphur impregnation that the present invention particularly relates. Before impregnating the cover, the flange portions 20 are bent at one hundred eighty degrees on the lines of scoring 16 and 17 to the position shown in Fig. 2. Some means is then employed to hold the flanges in bent position, and the material is then immersed in a bath of melted crude sulphur. Due to the use of the wide scoring, there is ample space 21 between the flanges and the bottom of the cover to provide for drainage of the sulphur. The sulphur permeates the material and forms a coating around and between the fibers thereof. When the sulphur solidifies, upon removal of the article from the bath and upon cooling thereof, it will tend to hold the flanges 20 in the position shown in Fig. 3, and the treatment will also greatly increase the strength and rigidity of the material as well as rendering the same waterproof. By referring to Figs. 3 and 4 it will be seen that the score lines 16 and 17 extend transversely of the corrugations of the corrugated board used to form the cover. Thus when the flanges are folded at one hundred eighty degrees, to the position of Fig. 3 for dipping in the sulphur, the fold lines will prevent the sulphur from entering the flutes of the corrugations except at the flanges. The sulphur in the flutes of the corrugations obviously is stopped by the fold lines from flowing into the main portion of the cover. Thus the main portion of the cover will have only its outside liners impregnated and the corrugated member between the liners will not be impregnated so that the corrugated member stays in very flexible condition.

Heretofore it has been proposed to treat covers of solid fiberboard with sulphur while the flanges are in a substantially ninety-degree position, and when the sulphur solidifies, it tends to hold the flanges in this particular position. This makes it impossible to compactly stack the covers for shipment, and in addition the projecting stiffened flanges are often broken, rendering the covers unfit for use. It is a feature of the present invention to ship the covers to the user while the flanges are bent at one hundred eighty degrees, in stacks, in the manner shown in Fig. 5, and it is apparent that the covers can be compactly shipped and stored in this manner and that there is no danger of the flanges getting broken.

In order to use the covers, the flanges are pulled outwardly in the manner shown in Fig. 4. Due to the fact that the corrugated member between the two outside liners has been protected from impregnation at the points 22 because the lines of fold 16 and 17 prevented the sulphur from flowing this far, the flanges can be opened out very readily without any danger of breaking the board at the score line. When the flanges are bent out to approximately ninety degrees or to the dot-and-dash line position of Fig. 4, there is a substantial resistance offered to any further movement. This resistance is due to the fact that only part of the sulphur coated fibers along the lines 22 have been broken, and none of the sulphur coated fibers along the lines 23. In addition to this tendency to resist further outward bending, the flanges also have a tendency to yield back toward their normal one hundred eighty-degree position. Thus when the covers are placed on a basket in the manner shown in Figs. 6 and 7, this tendency of the flanges to yield inwardly causes the same to closely hug and engage the sides of the basket as is clear from Fig. 7. This flange forms a very rigid arrangement to reinforce the side wall of the container and protect the same from inward crushing forces, and as a result the basket proper can be made of relatively lightweight cheap material as the cover will tend to take all the major strains.

As a result of this method therefore of employing corrugated board and of scoring the corrugated board in a particular direction with respect to the direction in which the corrugations extend, a cover can be made which can be shipped in flat condition as shown in Fig. 5, wherein the flanges can be bent out to ninety degrees at the time of assembly without breaking the board along the lines of scoring, and wherein the tendency of the flange to resist bending past ninety degrees, results in an advantage during use thereof.

Substantially the same method of procedure can be carried out in manufacturing other container elements such as a liner for a shipping container. It is therefore proposed to reinforce an ordinary unimpregnated shipping container by the use of an impregnated liner. However, the problem of constructing the liner in such a way that it could be shipped flat was present and had to be solved. With the present method a box liner of corrugated board consisting of a plurality of foldably connected sections 24, 25, 26 and 27 and scored along the lines 28, 29 and 30 which in this instance extend parallel to the corrugations of the board, is preferably held in the position shown in Fig. 8 and dipped in a bath of molten sulphur while in such position. It is then withdrawn and quickly folded to the position of Fig. 9 and held in this position until the sulphur solidifies. It may of course be originally dipped while in the position of Fig. 9, but due to the large area of most liners there is some problem of proper drainage when in this position even when utilizing the wide scoring. In this instance, by having the lines of scoring parallel to the corrugations of the corrugated board, as is clearly shown in Fig. 8, the sulphur will flow through the flutes of the corrugated board and impregnate the center corrugated member. This results in substantially greater rigidity, but due to the fact that corrugated board has been employed, even though the center corrugated member is impregnated, it will crush fairly readily during folding and result in flexibility on the lines of scoring. The additional rigidity obtained by allowing the sulphur to penetrate within the flutes of the corrugations, is advantageous in a liner where maximum rigidity is necessary.

These liners may then be shipped in stacked form as shown in Fig. 14 together with the collapsed containers proper. The user then assembles the containers 31 in the ordinary manner preparatory to inserting the liners therein. To prepare the liner for insertion, the section 24 is swung out toward the dot-and-dash line position of Fig. 9 causing breakage of some of the sulphur coated fibers along the line 25' on one side of the line of scoring 28. As in the case of the basket cover, there will be a tendency to resist bending past ninety degrees. The section 27 is bent outwardly in a similar manner toward the dot-and-dash line position of Fig. 9, and there will be a similar tendency to resist bending past ninety degrees. In the case of the sections 25 and 26 which are normally held by the solidified sulphur in a position of alinement, these sections are bent relative to one another on the line of scoring 29 from the position of Fig. 10 to the position of Fig. 11, and it will be noted that the sulphur impregnated shoulder 32 which is a part of the line of scoring 29 forms a stop to resist bending of the section 25 past ninety degrees as indicated in Fig. 11. The liner thus prepared is inserted in the container in the manner shown in Fig. 12 and pushed downwardly into registration with the side walls of the container.

As a result of the particular method of impregnation and of the use of corrugated board, these liners may be shipped flat as shown in Fig. 14, and due to the impregnated construction at the lines of scoring, the corners of the liner will have unusual strength to brace the container against external forces on said corners. In addition, the stiffening throughout the liner resulting from the impregnation reinforces all of the side walls and also renders to the shipping container a vertical rigidity which permits stacking of a number of boxes one above another without danger of crushing the boxes below. This feature of the invention is particularly advantageous when containers are stored in cold storage rooms, as even if the walls of the container proper are weakened by absorption of moisture, nevertheless, waterproof liners will hold the container in proper shape.

By referring to Figs. 15 to 19 inclusive, it may be seen that by the use of the improved method, a knockdown container may be formed. In forming the container, a section of corrugated board, as shown in Fig. 15, is scored along lines 32, 33, 34 and 35 to provide four side walls 36, 37, 38 and 39, and a stitching flange 40. The lines of scoring preferably extend parallel to the direction in which the corrugations of the corrugated board extend. After being scored, the material is folded to approximately the position shown in Fig. 15, and dipped in molten sulphur while in such position. The sulphur will enter the flutes of the corrugated board and impregnate the center corrugated member. After the material has been thoroughly impregnated, it is withdrawn from the bath and quickly folded to the position of Fig. 16 and held in this position until the sulphur solidifies. The material may of course be originally dipped while in the position of Fig. 16, but due to the large area of the side walls, there is some problem of proper drainage if it is dipped while in the position of Fig. 16.

A separate bottom member is also formed from a section of corrugated board which has been scored along the lines 41, 42, 43 and 44 to provide flanges 45, 46, 47 and 48. This bottom member is preferably dipped while the flanges 45 and 46 are bent at one hundred eighty degrees, as shown in Fig. 17, and while the end flanges 47 and 48 are bent at ninety degrees. These bent flanges prevent the sulphur from traveling through the flutes of the corrugated member and therefore give greater flexibility at the lines of fold. When the cover is withdrawn from the molten sulphur, the flanges 47 and 48 are folded back to the dot-and-dash line position of Fig. 17 and held in this position until the sulphur solidifies.

A cover member 49 having apertures 50 therein is formed of corrugated board impregnated in an identical manner as that heretofore described in connection with the basket cover, its final form for shipment being shown in Fig. 19. Thus, all three elements which go to make up the completed container are shipped in the flat compact form shown in Figs. 16, 17 and 19.

When the container is assembled by the user, the section shown in Fig. 16 forming the side walls, is opened out on the lines of scoring in the manner heretofore described in connection with the box liner of Fig. 12. The bottom forming member of Fig. 17 is prepared for assembly by folding the flanges 45 and 46 from their one hundred eighty-degree position to a ninety-degree angle, and, as heretofore described in connection with the basket, these flanges will resist bending to a greater angle than ninety degrees. The flanges 47 and 48 are also folded from a flat position to a ninety-degree position. These flanges are then stitched to the side walls of the box, and the side wall stitching flap 40 is also stitched in proper position to form the assembled structure shown in Fig. 18. The side walls may have a plurality of soft wire ears 51 attached to the upper edge thereof, and after the flanges of the cover 49 are folded outwardly to a ninety-degree position to embrace the sides of the box, these ears will pass through the apertures 50 of the cover and may then be bent over to lock the cover in position. It will thus be seen that a container has been formed from the use of corrugated board which has been scored prior to impregnation and folded in a particular way during and after impregnation. This method of procedure makes it possible to ship all of the container elements in knockdown form notwithstanding the impregnation thereof, and due to the material used, i. e. corrugated board and the method of scoring, the container parts may be folded to assembly position without breaking the board along the lines of scoring. As a result, a container may be formed which has unusual rigidity to permit stacking of a number of boxes, one upon another, without danger of crushing the boxes below. Furthermore, the impregnated side walls resist inward pressure and are unaffected by moisture.

Although in the above description only a few applications of the improved method have been described, it is obvious that various other articles may be formed. It is also obvious that various changes and modifications may be made without departing from the spirit of the invention, and all of such changes are contemplated as may come within the scope of the claims.

What I claim is:

1. The method of manufacturing a container element comprising scoring a section of corrugated board along desired lines, dipping the previously scored corrugated board into melted sulphur, permitting the sulphur to solidify while the container element is in flat condition for shipment, and subsequently folding said container element to assembly form on such lines of scoring while the sulphur is in solidified form.

2. The method of manufacturing a container element comprising scoring a section of corrugated board along lines extending transversely to the direction in which the corrugations extend, folding portions of the element on said lines of scoring, dipping the previously scored section into melted sulphur while said portions are so folded to prevent travel of sulphur through the flutes of the corrugated board, permitting the sulphur to solidify while the container element is in compact condition for shipment, and subsequently folding said container element to assembly form on said lines of scoring.

3. The method of manufacturing a container element comprising scoring a section of corrugated board along desired lines, dipping the corrugated board into melted impregnating material, folding portions of the element on said lines of scoring to a superimposed compact condition for shipment prior to solidification of the impregnating material, permitting the impregnating material to solidify to thereby hold the element in said compact condition, and subsequently bending said folded portions to approximately ninety degrees for assembly purposes.

4. The method of manufacturing a container element comprising scoring a section of corrugated board along desired lines, dipping the corrugated board into melted impregnating material, folding portions of the element at substantially one hundred eighty degrees on said lines of scoring to a superimposed compact condition for shipment prior to solidification of the impregnating material, permitting the impregnating material to solidify to thereby hold the element in said compact condition, and subsequently bending said folded portions to approximately ninety degrees for assembly purposes.

5. The method of manufacturing a container element comprising scoring a section of corrugated board along desired lines, dipping the corrugated board into melted sulphur, folding portions of the element on said lines of scoring to a superimposed, compact condition for shipment prior to solidification of the sulphur, permitting the sulphur to solidify to thereby hold the element in said compact condition, and subsequently bending said folded portions to approximately ninety degrees for assembly purposes.

6. The method of manufacturing a container element comprising scoring a section of corrugated board along desired lines, folding portions at approximately one hundred eighty degrees on said lines of scoring to a superimposed compact condition for shipment, dipping the section of corrugated board into impregnating material while said portions are so folded, permitting said impregnating material to solidify and thereby hold the folded portions in position, and subsequently bending said folded portions to approximately ninety degrees for assembly purposes.

7. The method of manufacturing a container element comprising putting relatively wide lines of scoring in a section of corrugated board, dipping the corrugated board into melted impregnating material, folding portions of the element on said lines of scoring to a superimposed compact condition for shipment prior to solidification of the impregnating material, permitting the impregnating material to solidify to thereby hold the element in said compact condition, and subsequently bending said folded portion to approximately ninety degrees for assembly purposes, the impregnating material along the wide lines of scoring tending to resist bending to any greater angle.

8. The method of manufacturing a container element comprising putting relatively wide lines of scoring in a section of corrugated board, dipping the corrugated board into melted impregnating material, folding portions of the element at substantially one hundred eighty degrees on said lines of scoring to a superimposed compact condition for shipment prior to solidification of the impregnating material, permitting the impregnating material to solidify to thereby hold the element in said compact condition, and subsequently bending said folded portion to approximately ninety degrees for assembly purposes, the impregnating material along the wide lines of scoring tending to resist bending to any greater angle.

9. The method of manufacturing a container element comprising putting relatively wide lines of scoring in a section of corrugated board, dipping the corrugated board into melted sulphur, folding portions of the element on said lines of scoring to a superimposed compact condition for shipment prior to solidification of the sulphur, permitting the sulphur to solidify to thereby hold the element in said compact condition, and subsequently bending said folded portions to approximately ninety degrees for assembly purposes.

10. The method of manufacturing a container element comprising putting relatively wide lines of scoring in a section of corrugated board, folding portions at substantially one hundred eighty degrees on said lines of scoring, dipping the section of corrugated board into impregnating material while said portions are so folded, permitting said impregnating material to solidify and thereby hold the folded portions in position, and subsequently bending the folded portions to approximately ninety degrees for assembly purposes, the impregnating material along the wide lines of scoring tending to resist bending to any greater angle, and said wide lines of scoring facilitating drainage of the impregnating material during dipping.

11. The method of manufacturing a container element comprising scoring a section of fiberboard along desired lines, dipping the board into melted impregnating material, folding portions of the element on said lines of scoring to a superimposed compact condition for shipment prior to solidification of the impregnating material, permitting the impregnating material to solidify to thereby hold the element in said compact superimposed condition, and subsequently bending said folded portions to assembly position.

12. The method of manufacturing a container element comprising scoring a section of corrugated board along desired lines, dipping the board into melted impregnating material, folding portions of the element on said lines of scoring to a superimposed compact condition for shipment prior to solidification of the impregnating material, permitting the impregnating material to solidify to thereby hold the element in said compact superimposed condition, and subsequently bending said folded portions to assembly position.

HERBERT M. KIECKHEFER.